No. 769,131. PATENTED AUG. 30, 1904.
M. DILLENBURG.
SEWER COUPLING.
APPLICATION FILED AUG. 15, 1903.
NO MODEL.

Witnesses:
E. H. Wilson
F. Schlotfeld

Inventor:
Mathias Dillenburg
By Rudolph Im Foy
Attorney.

No. 769,131. Patented August 30, 1904.

UNITED STATES PATENT OFFICE.

MATHIAS DILLENBURG, OF CHICAGO, ILLINOIS.

SEWER-COUPLING.

SPECIFICATION forming part of Letters Patent No. 769,131, dated August 30, 1904.

Application filed August 15, 1903. Serial No. 169,583. (No model.)

*To all whom it may concern:*

Be it known that I, MATHIAS DILLENBURG, a citizen of the United States, residing at Chicago, in the county of Cook and State of Illinois, have invented certain new and useful Improvements in Sewer-Couplings; and I do hereby declare the following to be a full, clear, and exact description of the invention, such as will enable others skilled in the art to which it appertains to make and use the same.

My invention relates to a novel construction in a sewer-coupling, the object being to provide a simple and efficient device for coupling the soil-pipe of a building with the sewer; and it consists in the features of construction and combinations of parts hereinafter fully described and claimed.

Figure 1:
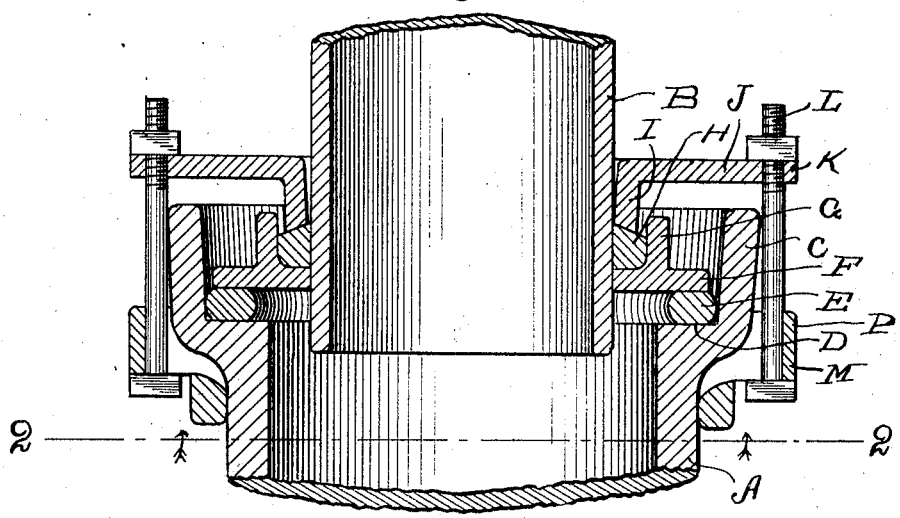
Figure 2:
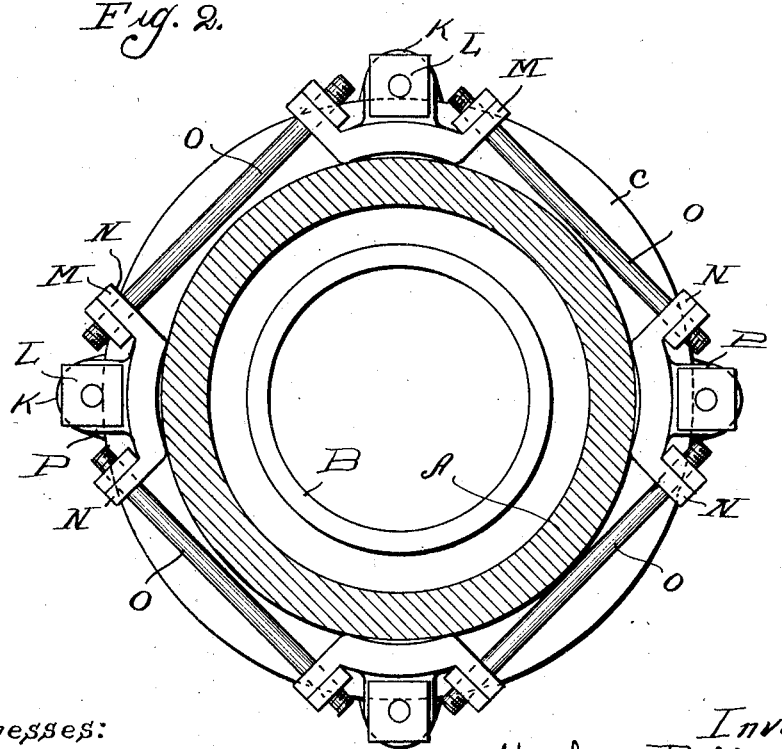

In the accompanying drawings, illustrating my invention, Figure 1 is a central section of a coupling constructed in accordance with my invention. Fig. 2 is a section of same on the line 2 2 of Fig. 1.

Referring now to said drawings, A indicates the sewer-pipe, and B the soil-pipe. The said sewer-pipe A is enlarged at its female end and is provided at said end with an annular flange C, within which is an annular shoulder D. Resting on said shoulder D is a ring E, of a suitable packing, and upon the latter rests a flat metal ring F, through the opening in which the soil-pipe B projects into the sewer-pipe A. The said ring F is provided on its outer face with an annular flange G, between which and said soil-pipe B a ring H, of packing, is interposed. Bearing upon said packing H is the inwardly-extending annular flange I of a clamping-plate J, having a central opening through which said soil-pipe B passes. The said plate J is supported by said packing H free of the outer end of the flange C of the sewer-pipe and is provided with a plurality of radial projections K, which extend beyond the outer face of the said flange C and are provided with openings to receive the bolts L, by means of which said plate is connected with the clamping members M of a collar secured to said pipe A below said flange C. Each of the said members M consists of a casting of segmental form provided at its ends with flaring lugs N, having openings to receive the ends of bolts O, which extend practically tangential to the periphery of said pipe A and connect said members M, thereby forming a collar surrounding said pipe A below said flange C. Each of said members M is further provided at its upper end with a lug P, which extends outwardly beyond the periphery of said flange C and receives the ends of said bolts L, being provided with openings for the passage of the latter.

The said bolts O serve to hold said members M in close contact with the pipe A, while between their ends they lie inwardly of the periphery of said flange C, thereby enabling the collar, of which they form a part, to be easily mounted on the pipe A, even though the latter lies so close to the wall of the building that the flange C is in contact therewith, and enable the members M to be so securely clamped in place as to render slipping, due to the strain exerted by the bolts L, impossible.

My said device is very simple and efficient, besides being lighter and cheaper than the average sewer connection now generally used.

I claim as my invention—

1. The combination with the female end of a sewer-pipe, of an annular member resting therein, packing interposed between said member and the shoulder of the pipe, a soil-pipe passing through said member, an annular outwardly-extending flange on said member, packing interposed between said flange and said soil-pipe, a plate provided with a central opening to receive said sewer-pipe and having an annular flange surrounding said opening and resting on said last-named packing, radial lugs on said plate, a collar surrounding said sewer-pipe below its female end, and bolts connecting said collar with said plate.

2. The combination of a sewer-pipe, a member within the end of said pipe, a soil-pipe entering the member through an opening therein, packing between the member and each of said pipes, a clamping-plate on the soil-pipe, a collar on the sewer-pipe made of a number of clamping members and bolts connecting said members, and bolts connecting the clamping-plate and said clamping members for clamping the parts together and at the same time forming tight joints with each of said pipes.

3. The combination of a sewer-pipe, a member within the end of said pipe, a soil-pipe entering the member through an opening therein, packing between the member and each of said pipes, a clamping-plate on the soil-pipe, a clamping-collar on the sewer-pipe, said collar comprising a number of segmental clamping members, lugs at the ends of said members, bolts passing through the opposing lugs of adjacent members to connect the members together, and bolts passing through said members and said clamping-plate to clamp the parts together and at the same time form tight joints with each of said pipes.

In testimony whereof I affix my signature in presence of two witnesses.

MATHIAS DILLENBURG.

Witnesses:
RUDOLPH WM. LOTZ,
E. F. WILSON.